INVENTORS
RUEBEN E. PAULSON
BY VICTOR E. ALBERTSON
ATTORNEYS

United States Patent Office 2,982,153
Patented May 2, 1961

2,982,153
VARIABLE SPEED DRIVE FOR TRACTOR TRANSMISSION

Victor N. Albertson and Rueben E. Paulson, Minneapolis, Minn., assignors to Minneapolis-Moline Company, Hopkins, Minn., a corporation of Minnesota Filed Apr. 21, 1958, Ser. No. 729,683

11 Claims. (Cl. 74—740)

Our invention relates generally to improvements in drive mechanisms for transmitting propulsion power from the engine to the traction wheels or other ground engaging members of a tractor and more specifically provides improvements in drive mechanisms such as those shown in Swenson Patent No. 2,660,900, issued December 1, 1953, Swenson et al. No. 2,747,416, issued May 29, 1956, and Swenson et al. No. 2,793,533, issued May 28, 1957. The present invention also relates to certain improvements in the copending application of Swenson et al. Serial No. 573,374, filed March 23, 1956, now Patent No. 2,838,940, issued June 17, 1958. The first identified Swenson patent supra discloses a change speed gearing or transmission per se while the latter three disclosures have in common the provision of means for varying the input speed, for a given engine speed, to the transmission itself. This is accomplished by means of what has come to be referred to in the field as a torque amplifier including a planetary gear carrier and intermeshing sun and planet gears. Means is provided to cause this planetary mechanism to rotate as a unit with the shaft driven by the tractor engine and with the drive shaft of the transmission itself. This may be regarded as the normal condition and when the planetary mechanism thus rotates as a unit with these shafts torque is transmitted from the engine to the transmission at engine speed, or at a one-to-one ratio. Means is also provided to release the planetary carrier from the shafts and lock it to the stationary transmission casing so that torque flow is through the sun and planet gears. As usually designed this results in a reduction of about one-half in the speed at the transmission input or the drive shaft thereof as compared to that of the engine driven shaft and a corresponding increase of torque, this being just about doubled when the speed is reduced by one-half. The advantages of a drive mechanism of this kind are many and just as one example a tractor operator, noting his engine speed beginning to fall off because of an increasing load when an implement pulled by the tractor encounters unusually heavy working conditions in the field, need no longer stop, declutch, shift the transmission to a lower gear setting and then start up all over again. Instead he merely operates the torque amplifier drive unit so that it instantly reduces the travel speed of the tractor-implement combination, and increases the torque supplied for propulsion, and then when the difficult area of the field is past he restores the torque amplifier to its normal condition and increasing travel speed again, all without ever having had to go through the work of clutching, gear shifting, throttling, etc.

When the planetary carrier is released from the engine driven shaft in order to bring the planetary gears into play and reduce the speed at which the transmission is driven the load reaction forces tend to mobilize the carrier to idly back rotate, or to turn in a direction opposite that of the shaft. In the previous drive units heretofore mentioned this tendency on the part of the carriers, which would obviously simply disable the drive and interrupt torque flow to the transmission, is counteracted by one-way or overrunning clutches which permit rotation of the carrier only in the end and, of course, the desired direction.

These torque amplifier drive units thus have been two speed in output, i.e., either engine speed or roughly one-half engine speed. Of course, the relative pitch diameters of the sun and planet gears will have a bearing on the output speed of the unit and may be designed to provide any two relative high and low speeds which may be desired, within the limits imposed by size, space, load and the other variables entering into the design. High speed usually will correspond to the engine speed as will be understood and the term is here used as a convenience only.

In accordance with our invention and as its primary object we provide for an infinite variation in the output speed of the planetary drive unit, within the range from zero or no torque output at all up to whatever low speed the drive unit may be designed for otherwise by the gear ratios employed in the unit. Such infinite variation in speed of the drive to the transmission is regulated by a manual control element convenient to hand of the tractor operator and by adjustment of such control element he may select what may well be referred to as infinitely variable super low speeds, in addition to his instantaneous control over the drive unit to produce its two relative high and low speeds. Thus we provide what amounts to an extended range planetary drive unit with a variable low speed range permitting controlled and very low travel speeds for the tractor which are particularly desirable where the tractor is operating a ditcher or trencher the desirable travel speeds of which may best be measured in feet or yards per hour, rather than in miles. However, other equipment commonly operated by tractors require minutely controlled variations in speed to meet varying crop conditions, corn pickers being a notable example. The extreme flexibility and the desirability of a drive of this nature will be so obvious to those skilled in the art that further recitation herein should not be required.

Another object of our invention is to provide, for a planetary two-speed drive unit of the type set forth characterized by the mobilization of the planetary carrier to rotate in a direction opposite that of the shaft driving it when released and torque is to be transmitted through the gears, of a rotary restrictor or retarding device along with means connecting the same for rotation with the carrier and manual control means for infinitely varying the magnitude of the force exerted to resist such rotation. As one example of a suitable mechanism for this purpose we have herein disclosed a rotary fluid pump geared to the planetary carrier for rotation thereby, with a suitable support for the pump, and with said pump connected in a hydraulic path or circuit including a fluid source and a manually actuatable control valve for regulating the amount of fluid moved by the pump. This is a simple and practical arrangement for the purpose since transmissions carry a considerable volume of lubricating fluid in their cases and this fluid may serve as the source for the pump. When the valve is closed the pump cannot rotate and therefore the planetary gear carrier is locked and the planetary drive unit is placed in its "low" speed setting. In fact when the extended range operation is not required the valve may remain closed and the usual control for the planetary drive unit will function as though the pump or restrictor and related components were not in the transmission at all. However, with this control in its low speed setting the operator may at any time open up the valve to permit fluid flow and rotation of the pump at any of its possible speeds whereupon the planetary gear carrier will back rotate to further reduce the speed through the drive unit as may be desired or required.

These and other more detailed and specific objects will be disclosed in the course of the following specification, reference being had to the accompanying drawings, in which—

Fig. 1 is a vertical longitudinal sectional view through a portion of a tractor embodying the present invention, showing the housing structure in section and indicating the relative locations of the engine flywheel and clutch, the main transmission, the variable drive or second transmission and the power take-off shaft. Also appearing in this view are portions of the tractor itself, such as the operator's seat and one of the rear traction wheels.

Figure 1:
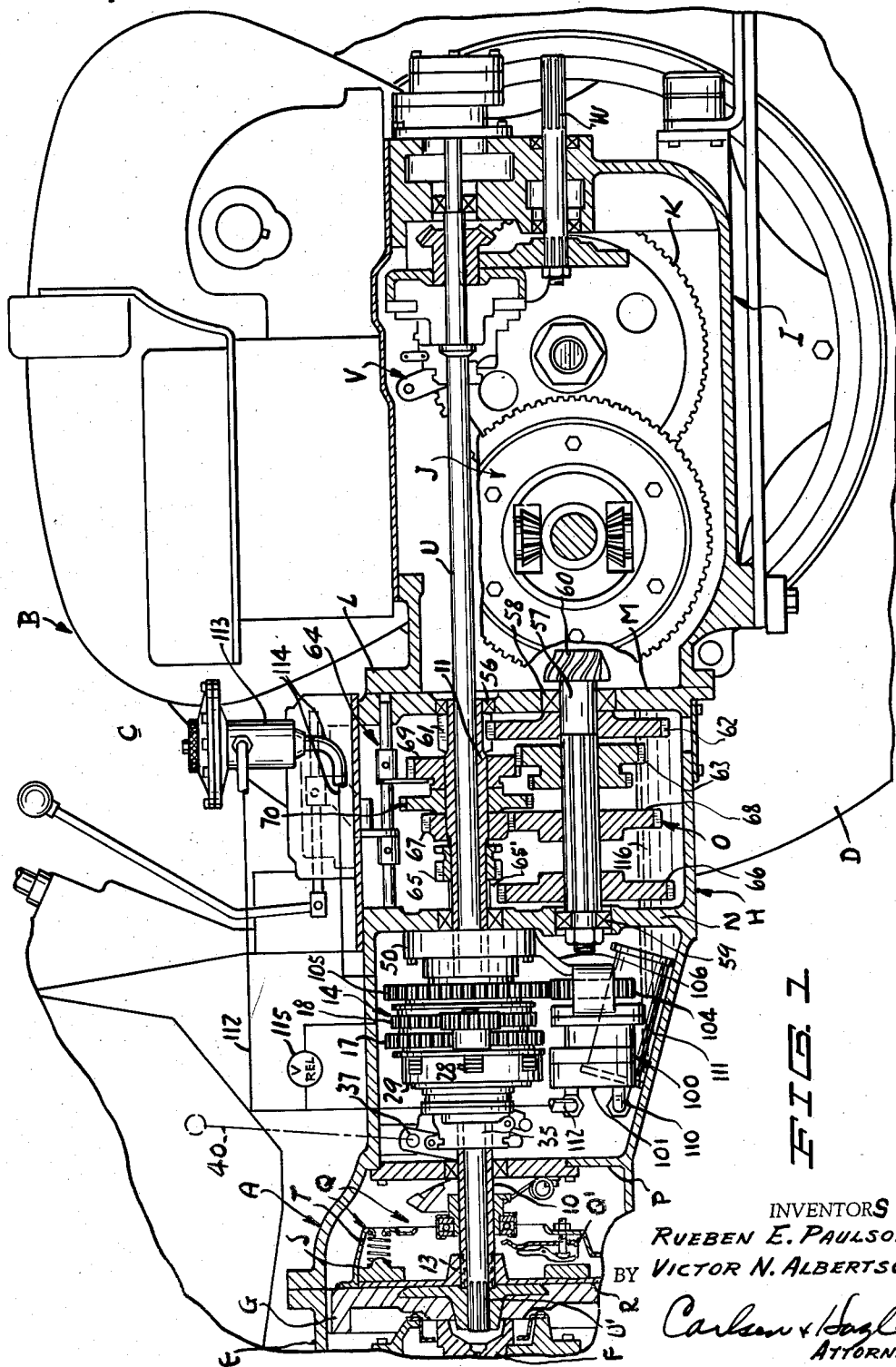

Referring now more particularly and by reference characters to the drawing A designates generally a housing which in accordance with present day tractor manufacturing methods forms the central chassis portion of the tractor, portions of which are designated generally at B, including an operator's station C and one of the two rear traction wheels D. The tractor, of course, has the usual engine, a portion of the crankcase of which appears at E and the rear flanged end of which is bolted to the housing assembly A in the usual fashion. The engine, of course, includes a crankshaft, a fragment of which is designated at F in Fig. 1 and secured on which is a flywheel G. The housing A comprises a forward portion H wherein the transmission components are located and a rear portion I in which the usual differential mechanism J and drive gears K for the traction wheels are mounted, these two front and rear portions of the housing being bolted together where their flanged ends meet at L. The forward portion H of the housing A includes a rear wall M and a central wall N which are spaced apart to accommodate therebetween the main change speed transmission unit, designated generally at O, and forwardly of the wall N there is a forward wall P spaced rearwardly from the crankcase E providing space for the accommodation of the usual manually operative engine clutch, designated generally at Q. As is best seen in Fig. 1 this clutch comprises at least one clutch disk R acting between the flywheel G and a clutch ring S and normally influenced by clutch springs T to transmit torque from the flywheel to the said ring. A power take-off shaft U is splined at its forward end U' into the hub portion of the flywheel G and extends rearwardly therefrom through the walls P, N and M of said housing A, it being obvious that this splined connection between the shaft and flywheel causes the former to be rotated whenever the tractor engine is in operation. The shaft U passes through front and rear independently rotatable hollow shafts 10 and 11, independently rotatable on the shaft 15, and at its forward end the shaft 10 is splined at 13 into the hub of the engine clutch Q so that whenever said clutch is engaged, as it normally is, then torque will be transmitted from the engine to the shaft 10. Mounted upon the shaft 10, immediately to the rear of the clutch Q, are the usual and quite conventional clutch operating collar and anti-friction bearing adapted for engagement with conventional clutch opening levers Q' which act, upon forward movement of the collar, to overcome the clutch springs T and free the clutch disk R from the flywheel and to break torque flow from the engine to the shaft 10, as will be readily understood.

The rear end of the power take-off shaft U is provided with a suitable clutch mechanism V and is geared to the usual, rearwardly projecting shaft W which powers various implements associated with the tractor.

Figure 2:
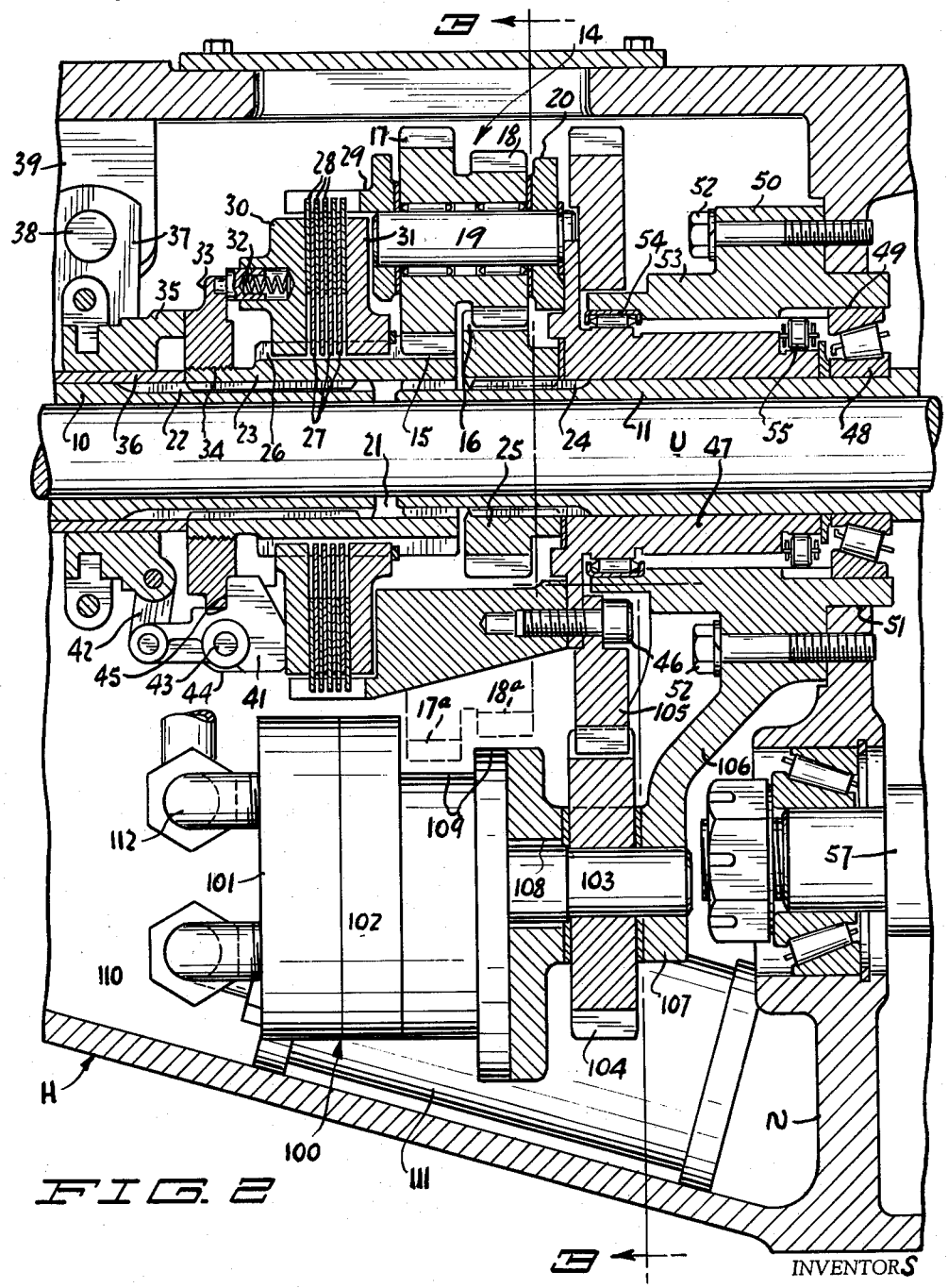
Fig. 2 is an enlarged vertical and longitudinal sectional view of the forepart of the structure shown in Fig. 1 particularly showing the variable speed drive unit for the main transmission and as associated with our present invention.
Figure 3:
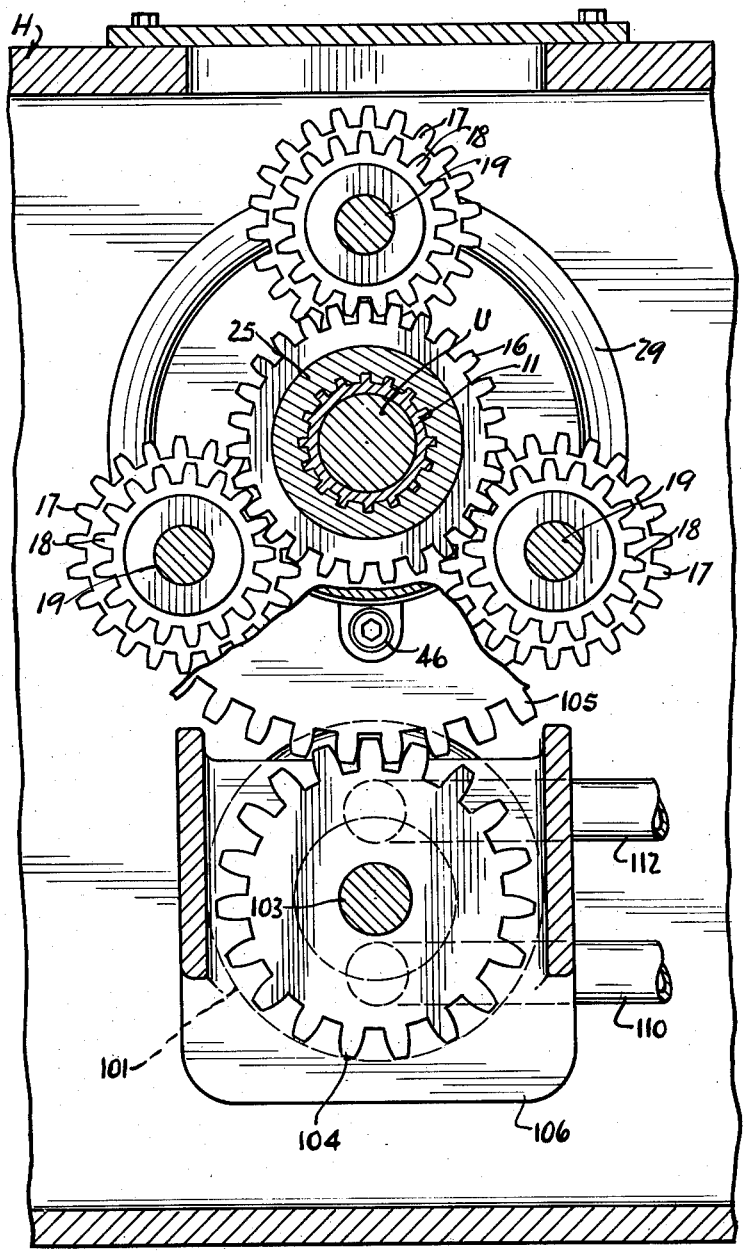
Fig. 3 is a fragmentary cross sectional detail along the line 3—3 in Fig. 2.

The space between the walls N and P accommodates the two-speed or variable drive unit or torque amplifier, designated generally at 14, which in effect functions as a second change speed transmission unit for driving the main change speed transmission unit O at varying speeds relative to that of the engine. This unit 14 is best shown in Figs. 2 and 3 and it comprises a planetary gear system having sun gears 15 and 16 cooperating with planet gears 17 and 18, the latter being rotatably carried upon pins 19 in a planetary carrier or cage 20. The two hollow shafts 10—11 terminate short of meeting, as indicated at 21, just forwardly of these cooperating planetary gears and at its rear end the shaft 10 is splined at 22 into a hollow sleeve 23 upon the rear end of which may be formed the gear teeth going to make up the sun gear 15. The forward end of the shaft 11 is likewise splined at 24 into the hub 25 of the sun gear 16 so that the planetary gear system joins the two shafts 17—18. The exterior of the sleeve 23 also has splines 26 by which the sleeve is non-rotatably associated with a series of clutch disks 27 interleaved between similar disks 28, the outer edges of which are relatively non-rotatably engaged with the forward portion 29 of the carrier 20. These interleaved clutch disks 27—28 are disposed between clutch rings 30 and 31 fitted at their inner edges to the splines 26 and normally the clutch disks are held engaged by the action of a series of clutch springs, one of which appears at 32, positioned in cavities formed in the forward clutch ring 30 and bearing against a collar 33 threaded at 34 on the forward end of the sleeve 23.

A clutch operating collar 35 is slidably mounted on a thrust sleeve 36 surrounding the shaft 10 forwardly of the collar 33 and this collar 35 is shiftable in a forward direction to disengage the clutch disks 27—28 by means of a shipper lever 37 pivotally suspended at 38 from a lug 39 in the upper part of the transmission housing. There is diagrammatically shown in Fig. 1 a hand lever at 40 for operation of this shipper lever 37 but, of course, any suitable control may be employed. Cam levers, one of which appears at 41, are connected by links 42 to the operating collar 35 and the levers are fulcrumed at 43 upon lugs 44 projecting forwardly from the clutch ring 30. As the collar 35 moves forwardly the levers 41 have a forward camming action at 45 upon the collar 33 to move the same forwardly the slight distance necessary to free the clutch disks 27—28.

Secured as seen at 46 to the rear end of the cage 20 is a hub 47 surrounding the shaft 11 and extending rearwardly to an anti-friction bearing 48 which supports the shaft where it passes through the housing wall N. Said bearing 48 is carried in a cylindrical recess 49 in a bearing collar 50 which projects through an opening 51 in the wall N and which is held in place against said wall by a series of cap screws 52. The bearing collar or mount 50 has a forwardly projecting hollow portion 53 within which are anti-friction bearings 54 and 55 rotatably supporting the hub 47 at spaced points for rotation independently of the shaft 11.

Turning now to Fig. 1 the main transmission unit O is very similar to that shown in Swenson patent No. 2,660,900, aforesaid, and provides five different output speeds for a given input or engine speed. Since the transmission is disclosed in detail in the Swenson patent only a very brief description should be necessary here. The hollow shaft 11 extends rearwardly to and is journaled at its rear end in an anti-friction bearing 56 in the rear housing wall M. A countershaft 57 is supported in anti-friction bearings 58—59 in the walls N and M and serves as the output shaft from the transmission, this shaft having at its rear end a bevel gear 60 for driving the differential J. Forwardly of the bearing 56 the shaft 11 has teeth forming a low speed drive gear 61 which is in constant mesh with a low speed driven gear 62 rotatably mounted upon the rear end portion of the countershaft. Forwardly of the gear 62 the countershaft 57 is splined for its full length and the forward face of the gear 62 has internal gear teeth (not shown) for selective engagement with the teeth of a shiftable gear 63 splined on the countershaft and having a peripheral groove for a shipper fork (not shown) but forming part of a gear shifting mechanism, designated generally at 64, located above the main transmission unit. This mechanism is of conventional construction including shifter rods and a gear shift lever located convenient to the operator's station C.

At the forward end of unit O there is a second speed drive gear 65 slidably splined on the shaft 18, as at 65', and shiftable forwardly from its normal position of Fig. 1 by said mechanism 64 to mesh with a second speed driven gear 66 splined on the forward end of the countershaft 57. The gear 65 also has clutch teeth adapted, when the gear is shifted rearwardly, to mesh with internal teeth (not shown) on a third speed drive gear 67 rotatably mounted on the shaft 11 and in constant mesh with a third speed driven gear 68 splined on the countershaft 57. A fourth speed drive gear 69 is rotatably and axially shiftably mounted on the shaft 11 and when shifted rearwardly from the position of Fig. 1 has internal teeth (not shown) to mesh with the aforesaid gear 61 and thus cause torque to be transmitted from the shaft 11 to the gear 69. The gear 69 meshes with the teeth on the aforesaid shift gear 63. A fifth speed drive gear 70 is keyed to the shaft 11, between the gears 67 and 69, and when the gear 63 is shifted forwardly from the position seen in Fig. 1 this gear 70 meshes with the gear teeth of smaller pitch diameter on the front end of gear 63.

Thus it will be seen that by properly shifting the gears 63, 65 and 69, torque may be transmitted from the shaft 11 to the countershaft 57 at five different speed ratios, the ratio being lowest when the gears 61—62 transmit the torque and growing progressively greater as the other gears come into play. It is not believed that further explanation of the operation should be necessary herein.

In what may, for convenience sake, be regarded as the normal operating condition of the transmission assembly herein disclosed the shaft 10, constituting the engine driven shaft and shaft 11 which is the input or drive shaft for the main change speed transmission O will operate at the same speed. This is, of course, the engine speed since shaft 10 is driven from the engine flywheel G through the engine clutch Q. Under these conditions the clutch 27—28 is engaged and the entire planetary drive unit or second change speed transmission as it may be called rotates as a unit with shafts 10—11. The torque path is then from shaft 11, through sleeve 23, clutch disks 27—28, the planetary carrier now locked to the shafts and to the splined forward end 24 of shaft 11. In the structure as thus far described the release of the clutch 27—28 will unlock the planetary carrier 20 from engine driven shaft 10 and the load reaction will tend to mobilize the carrier to idly rotate in an opposite direction, or to back rotate, with the planet gears 17—18 orbiting about the sun gears 15—16 so that no torque is transmitted to the shaft 11. In the Swenson et al. patents previously identified this back rotation was prevented by applying a brake band to the planetary gear carrier to hold it stationary whereas in the copending Swenson et al. application also previously identified the back rotation is prevented by use of a one-way clutch between the carrier and the rotationally stationary bearing assembly to the rear of the carrier. Use of either expedient will, as will be understood, hold the planetary carrier stationary so that torque flow from shaft 10 to shaft 11 takes place through the sun and planet gears and it will be noted that the relative pitch diameters of gears 15—17 and 18—16 as here shown are such that the speed of the shaft 11 will be substantially reduced, relative to that of shaft 10, under these conditions.

In accordance with our present invention, however, we provide means for either locking the planetary carrier 20 against back rotation by load reaction so that the planetary gear drive unit provides exactly the same relatively high and low input speeds into the transmission O as it has in the past, or for permitting restricted or retarded back rotation of the carrier at infinitely variable speeds. In order to accomplish this we provide a restrictor element, designated generally at 100, the permissible speed of rotation of which may be readily and positively controlled and connect this element to the planetary carrier 20 for rotation thereby. In the present instance the element 100 is a fluid pump 101 having a casing 102 from which projects a shaft 103 upon which is secured a spur gear pinion 104 meshing with a ring gear 105 secured to the carrier 20 by the same cap screws 46 which secure this carrier to the aforesaid hub 47. The rotationally stationary bearing collar 50 has a projection 106 formed with spaced apart webs 107—108 between which the pinion 104 is located and through which the pump shaft 103 is rotatably mounted. The pump casing 101 is contoured at 109 to clear the planet gears 17—18 as they orbit, their positions as they pass the pump being indicated by the dotted lines 17ᵃ—18ᵃ in Fig. 2. The pump 101 has an inlet connection 110 to a conventional oil filter 111 located at the bottom of the transmission housing A so that the pump will draw from the supply of lubricating fluid always present. The discharge connection 112 of the pump is then connected as schematically shown in Fig. 1 to a manual control valve 113 located convenient to the operator's station C and having a return connection 114 to the transmission housing. While not particularly material to an understanding of our invention it will be noted that a pressure relief valve 115 is connected between the pump discharge connection 112 and the transmission housing for an obvious purpose. The pump 101, the fluid in the transmission housing (a part of which appears at 116 in Fig. 1), the valve 113 and the connections therebetween constitute a fluid circuit or path through which fluid may be driven by the pump from the source and back thereto, under control of the valve. The rate at which fluid flows through this circuit or path, and hence the permissible speed of the pump 101, may be controlled with infinite and positive precision by adjusting the valve 113.

In the operation of this extended range and variable speed drive unit the valve 113 may be closed tight so that the pump 101 is locked, the planetary gear carrier 20 prevented from back rotating and torque flow from shaft 10 to shaft 11 will be through the planetary gears 15–18 as has been described, the input speed to the transmission O being determined by (a) the engine speed and (b) the ratio of the gears involved. But as the valve 113 is gradually opened the pump 101 is permitted to rotate and the planetary carrier may back rotate to add another variable (c) the controlled rotation of the planetary carrier which, as will be evident, further diminishes the speed of the shaft 11 with respect to shaft 10. When the valve 113 is full open the pump 101 is free to rotate and since it then imposes no restriction on the planetary carrier the latter will turn freely, the planet gears merely orbit and torque to shaft 11 will be broken. Between these extremities infinite variations are possible so that the tractor travel speed may be adjusted by the operator, merely by manipulating the valve 113, to meet any working conditions which may be encountered. Very low, or what may be referred to as super-low, travel speeds are possible with high torque supplied for propulsion thus making the tractor suitable for use with trenchers and other equipment where low speed is a necessity for successful operation. When the clutch 27—28 is engaged valve 113 will, of course, be opened so that the pump will impose no restriction on rotation of the planetary carrier during the "normal" operation heretofore described.

The expression "back rotation" as here used with reference to the motion of the planetary carrier 20 is used for convenience only in describing the operation of the drive unit, bears no relationship to rearward travel of the tractor, and is not to be regarded as limiting in any respect.

It will be noted that the restrictor element 100 is located on an axis parallel to that of the shafts 10—11 but offset radially with respect thereto. Thus this restrictor element adds nothing to the aggregate length (axially) of the clutch Q, and the main and second transmission units, as it would were the restrictor components interposed between these units along the axis of the shafts. This is important as the overall length of the assembly must be reduced as much as possible to properly fit into the space in the transmission-chassis housing A, etc., of the tractor.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. For a self-propelled tractor vehicle having an operator's station and including an engine driven shaft and a change speed transmission operative to transmit propulsion power from said shaft at differing drive ratios for a given rate of rotation of said engine driven shaft, said transmission having a drive shaft; drive mechanism for connecting said shafts and comprising in combination, a planetary gear carrier, meshing gears on the respective shafts and on the carrier, clutch means operative to lock the carrier to rotate with and in the same direction as both shafts whereby torque will pass from the engine driven shaft directly to the transmission drive shaft, and a manually controllable fluid circulating mechanism operatively associated with said carrier and permitting controlled rotation of the carrier in an opposite direction of rotation to transmit torque from the engine driven shaft to the transmission drive shaft through said gears, said mechanism including a manually adjustable valve at said operator's station for varying the speed at which rotation is transmitted from the engine to the said drive shaft.

2. For a tractor vehicle having an operator's station and including an engine driven shaft and a change speed transmission operative to transmit propulsion power from said shaft at differing drive ratios for a given rate of rotation of said engine driven shaft, said transmission having a drive shaft; a planetary drive mechanism for connecting said shafts and comprising in combination, a planetary gear carrier, gears on the respective shafts and planetary gears on the carrier meshing with the gears on the shafts, clutch means operative to releasably lock the carrier to the said engine driven shaft whereby said gears will cause the carrier to rotate in unison with the shafts in one direction whereby torque will pass from the engine driven shaft to the transmission drive shaft with no relative rotation of said gears, and manually controlled means having a control device at the operator's station and operative for locking the carrier for permitting infinitely variable rotation of the carrier in an opposite direction to that of the shafts and transmit torque at varying speeds from the engine driven shaft to the transmission drive shaft through said gears.

3. In a tractor propulsion power transmitting mechanism for transmitting torque from an engine clutch controlled driven shaft to a ground engaging member on the tractor and propelling the tractor, the combination comprising a main change speed transmission having power trains of different speed ratios, said transmission being operatively connected to said ground engaging member, a drive shaft for the main change speed transmission unit, a fluid controlled drive unit located coaxially with and connecting said shafts and operative in one condition to transmit torque at a one to one ratio between the shafts but also adjustable to transmit torque at variable speed ratios between the shafts, said fluid controlled drive unit including torque transmitting gears, a manual control device separate from said gears and controlling the speed ratio between the shafts, and a fluid moving restrictor element parallel to and offset axially with respect to the drive unit and controlled by said control device.

4. For a tractor having an engine driven shaft and a change speed transmission operative to transmit propulsion power from said shaft at differing drive ratios for a given rate of rotation of said engine driven shaft, said transmission having a drive shaft; drive mechanism for connecting said shafts and providing a torque path therebetween, said drive mechanism comprising in combination, a planetary gear carrier, meshing gears on the respective shafts and on the carrier, clutch means operative to lock the carrier to rotate with and in the same direction as both shafts whereby torque will pass from the engine driven shaft directly to the transmission drive shaft, a hydraulic restrictor arranged clear of said torque path, means connecting the carrier to said restrictor and operative when said clutch means is disengaged to drive the restrictor with the carrier turning in an opposite direction of rotation whereby torque is transmitted from the engine driven shaft to the said drive shaft through said meshing gears, and means for controlling the restrictor and thereby varying the speed at which torque is transmitted to the drive shaft.

5. For a tractor including an engine driven shaft and a change speed transmission driven by said shaft, a variable speed drive unit connecting said shaft and transmission whereby a torque path from the shaft to the transmission is provided and the output speed of the transmission may be varied at any change speed adjustment thereof, said drive unit comprising a rotatably supported planetary carrier and sun and planet gears forming a part of said torque path, a clutch device operative to lock the carrier to the shaft to rotate in one direction as a unit therewith whereby torque is transmitted at one to one ratio from the engine driven shaft to the transmission, said planetary carrier rotating in an opposite direction when said clutch device frees the carrier from the shaft, and a uni-directionally effective fluid moving rotation restrictor arranged clear of said torque path and operatively connected to the carrier to resist said last mentioned and opposite directional rotation of the carrier and thereby cause torque to flow from the shaft to the transmission through said sun and planet gears.

6. For a tractor including an engine driven shaft and a change speed transmission driven by said shaft, a variable speed drive unit connecting said shaft and transmission whereby the output speed of the transmission may be varied at any change speed adjustment thereof, said drive unit comprising a rotatably supported planetary carrier and sun and planet gears operatively connecting the shaft, carrier and transmission, a manually controlled device operative to selectively lock the carrier to the shaft to rotate in one direction as a unit therewith whereby torque is transmitted at one to one ratio from the engine driven shaft to the transmission, said device being also operative to unlock the carrier from the shaft whereby it will be mobilized to rotate in an opposite direction under influence of load reaction forces, a fluid circuit and means operative during said last mentioned and opposite directional rotation of the carrier to move fluid through said circuit, and manually controlled means located parallel to but offset from said drive unit and operative for regulating the rate at which fluid is moved through said circuit to thereby control the speed of rotation of the carrier while it is unlocked from said shaft and cause torque to pass from the shaft through the sun and planet gears to the transmission at variable speeds.

7. For a tractor including an engine driven shaft and a change speed transmission driven by said shaft, a variable speed drive unit connecting said shaft and transmission whereby the output speed of the transmission may be varied at any change speed adjustment thereof, said drive unit comprising a rotatably supported gear carrier, gears on the carrier operatively connecting the shaft to the transmission and a manually controlled device operative to selectively lock the carrier to the shaft to rotate in one direction as a unit therewith whereby torque is transmitted at one to one ratio from the engine driven shaft to the transmission, said device being also operative to unlock the carrier from the shaft whereby it will tend to rotate in an opposite direction under influence of load reaction forces, a fluid circuit including a fuid source, a pump and a valve controlling flow through said pump, and cooperating gears on the carrier and pump to rotate said pump during said last mentioned and opposite directional rotation of the carrier and move fluid through said circuit at a rate controlled by the valve to thereby control the speed of rotation of the carrier or halt such rotation while it is unlocked from said shaft.

8. In a tractor including an engine driven shaft and a change speed transmission having a drive shaft, a variable speed drive connection for said shafts whereby the output speed of the transmission may be varied at any change speed adjustment thereof, said drive connection comprising a rotatably supported planetary gear carrier, a sun gear on each shaft, relatively non-rotatable planet gears on the carrier meshing with the respective sun gears, a manually controlled clutch operative for locking the carrier to the engine driven shaft whereby said carrier and gears rotate as a unit in one direction with said shafts and torque is transmitted without speed change from the engine driven shaft to the transmission drive shaft, a hydraulic circuit including a rotary pump arranged on an axis parallel to the drive connection, and a manual control means controlling the rate of fluid flow through said pump in one direction of rotation thereof, and rotation transmission means connecting said planetary gear carrier and the pump and operative to rotate said pump when said clutch is disengaged whereby the control of said pump by said manual control will provide infinitely variable speed torque flow from the engine driven shaft through the gears to the said drive shaft.

9. For a self-propelled vehicle having an engine and a ground engaging member and a transmission mechanism for transmitting propulsion power from the engine to the member and which includes a drive shaft operatively connected to the engine, a driven shaft operatively connected to the ground engaging member, and a main transmission unit having change speed gear trains of different speed ratios operative to transmit torque from the engine to the driven shaft at selected ratios relative to a given engine speed; the improvement comprising a second transmission unit having a planetary change speed gear train and operatively connecting the engine to the said main change speed transmission unit for selectively driving the same at engine speed and at a predetermined lower than engine speed depending on the characteristics of the planetary gear train, the said second transmission unit including a carrier element having an axis of rotation, sun and planet gears respectively carried by the shafts and by the carrier, means for releasably locking the said carrier element to the drive shaft to rotate in unison therewith whereby the second transmission unit drives the first transmission unit at engine speed and said carrier element when unlocked from the drive shaft being mobilized by load reaction forces to tend to back rotate in a direction opposite to its direction of rotation by the drive shaft and thereby interrupt torque flow to the second transmission unit, a fluid system including a series connected fluid source and control valve and a pump, and said carrier element being connected to operate said pump upon said back rotation of the carrier element and to thereby circulate fluid through the fluid system, and said valve controlling the resistance to said fluid circulation by the pump to thereby vary the rotational speed of the carrier element as the same is mobilized to back rotate by load reaction forces from a zero speed relative to the drive shaft to maximum speed relative thereto and thereby vary the speed at which torque is transmitted to the main transmission unit from zero speed up to said predetermined lower than engine speed.

10. For a self-propelled vehicle having an engine and a ground engaging member and a transmission mechanism for transmitting propulsion power from the engine to the member and which includes a drive shaft operatively connected to the engine, a driven shaft operatively connected to the ground engaging member, and a main transmission unit having change speed gear trains of different speed ratios operative to transmit torque from the engine to the driven shaft at selected ratios relative to a given engine speed; the improvement comprising a second transmission unit having a planetary change speed gear train and operatively connecting the engine to the said main change speed transmission unit for selectively driving the same at engine speed and at a predetermined lower than engine speed depending on the characteristics of the planetary gear train, the said second transmission unit including a carrier element having an axis of rotation, said planetary gear train having sun and planet gears operatively connected to the shafts and carrier element, means for releasably locking the said carrier element to the drive shaft to rotate in unison therewith whereby the second transmission unit drives the first transmission unit at engine speed and said carrier element when unlocked from the drive shaft being mobilized by load reaction forces to tend to back rotate in a direction opposite to its direction of rotation by the drive shaft and thereby interrupt torque flow to the second transmission unit, a fluid system including a series connected fluid source and control valve and a pump, and said carrier element being connected to operate said pump upon said back rotation of the carrier element and to thereby circulate fluid through the fluid system, and said valve controlling the resistance to said fluid circulation by the pump to thereby vary the rotation speed of the carrier element as the same is mobilized to back rotate by load reaction forces from a zero speed relative to the drive shaft to maximum speed relative thereto and thereby vary the speed at which torque is transmitted to the main transmission unit from zero speed up to said predetermined lower than engine speed, said pump being located parallel to but radially offset from the rotational axis of the second transmission unit.

11. In a tractor, mechanism for transmitting propulsion power from the engine to the traction wheels, comprising a main change speed transmission unit located rearwardly of the engine and having power trains of different speed ratios changeable while the tractor is at rest, a clutch having a part driven by the engine when the clutch is engaged, a drive shaft extending rearwardly from and operatively connected to the said clutch part for rotation by the engine when the clutch is engaged, the main change speed transmission unit having an input shaft coaxial with the drive shaft, a second change speed transmission unit located forwardly of the main transmission unit and behind said clutch and connecting the drive shaft to the input shaft of the main transmission unit, the said second transmission unit having planetary gearing and means for selectively controlling the same to cause high speed low torque output and alternatively a lower speed higher torque output to be transmitted to the main change speed transmission and thence to said wheels while the tractor is in motion, the clutch and both of said transmission units being coaxially arranged, the said second transmission unit including sun and planet gears, a carrier for the planet gears, the said carrier and planetary gearing rotating as a unit with the drive shaft when transmitting said high speed low torque output, a fluid supply system including a reservoir and a valve, a fluid pump connecting the valve and reservoir and located on an axis parallel to but spaced from the axis of said drive shaft, means connecting the carrier to the pump whereby rotation of the carrier in one direction will operate the pump at a speed regulated by said valve, and means supporting the pump within a space conforming substantially to the front to rear space occupied by one of said transmission units.

References Cited in the file of this patent

UNITED STATES PATENTS

| | | |
|---|---|---|
| 1,879,921 | Clohecy | Sept. 27, 1932 |
| 2,151,722 | Szekely | Mar. 28, 1939 |
| 2,263,707 | Strigl | Nov. 25, 1941 |
| 2,923,176 | Randt | Feb. 2, 1960 |

FOREIGN PATENTS

| | | |
|---|---|---|
| 845,747 | France | May 22, 1939 |